(12) United States Patent  (10) Patent No.: US 8,905,704 B2
Sauer                           (45) Date of Patent:     *Dec. 9, 2014

(54) WIND SAIL TURBINE

(75) Inventor: Dieter Sauer, Westlake Village, CA (US)

(73) Assignee: Sauer Energy, Inc., Camarillo, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/357,424

(22) Filed: Jan. 24, 2012

(65) Prior Publication Data

US 2012/0301301 A1  Nov. 29, 2012

Related U.S. Application Data

(63) Continuation of application No. 13/134,049, filed on May 27, 2011, now Pat. No. 8,864,440.

(60) Provisional application No. 61/456,876, filed on Nov. 15, 2010.

(51) Int. Cl.
*F03D 3/02* (2006.01)
*F03D 3/06* (2006.01)

(52) U.S. Cl.
CPC ............ *F03D 3/065* (2013.01); *F05B 2240/211* (2013.01); *F05B 2240/32* (2013.01); *Y02E 10/74* (2013.01); *F05B 2240/30* (2013.01)
USPC ........ 415/4.2; 416/24; 416/197 A; 416/197 R; 416/231 B; 416/231 R; 416/243

(58) Field of Classification Search
USPC .............. 415/4.2, 4.4, 907, 144; 416/227 R, 416/231 R, 231 B, 197 R, 197 A, 197 B, 243, 416/235, 236 R
See application file for complete search history.

(56) References Cited

U.S. PATENT DOCUMENTS 574,411 A * 1/1897 Gassett ......................... 416/142
1,100,332 A   6/1914 Smith
(Continued)

FOREIGN PATENT DOCUMENTS

DE    10319003 A1 * 11/2004 ................ F03D 3/06
EP     0993551 A1    4/2000
(Continued)

OTHER PUBLICATIONS

English Machine Translation of DE 10319003 A1.*

*Primary Examiner* — Edward Look
*Assistant Examiner* — Wayne A Lambert
(74) *Attorney, Agent, or Firm* — Brooks Kushman P.C.

(57) ABSTRACT

A wind turbine comprising a drive shaft; at least one vane connected to the drive shaft; and a torque converter attached to the vane, the torque converter comprising an airfoil, the torque converter being adapted to capture air for use in aiding the vane to rotate. Certain embodiments include the vane comprising a first surface and a second surface positioned opposite to the first surface, the first surface comprising a plurality of wind disrupters. Certain embodiments include a plurality of vanes rotatably connected to the drive shaft, the plurality of vanes comprising a plurality of strakes adapted to capture air and direct air to the drive shaft. Yet certain embodiments include a first air scoop connected to the vane, the first air scoop comprising a first air scoop portion at an angle relative to the vane.

15 Claims, 5 Drawing Sheets

(56) References Cited

U.S. PATENT DOCUMENTS

| | | | |
|---|---|---|---|
| 1,697,574 A | 1/1929 | Savonius | |
| 1,835,018 A | 12/1931 | Darrieus | |
| 2,020,900 A | 11/1935 | Methvin | |
| 2,716,460 A * | 8/1955 | Young | 416/24 |
| 3,208,722 A | 9/1965 | Rodriquez et al. | |
| 3,672,017 A | 6/1972 | Nielsen et al. | |
| 3,918,839 A | 11/1975 | Blackwell et al. | |
| 3,967,507 A | 7/1976 | Emms | |
| 4,015,911 A * | 4/1977 | Darvishian | 416/119 |
| 4,039,849 A | 8/1977 | Mater et al. | |
| 4,236,866 A | 12/1980 | Zapata Martinez | |
| 4,255,085 A * | 3/1981 | Evans | 416/197 A |
| 4,293,274 A | 10/1981 | Gilman | |
| 4,362,470 A * | 12/1982 | Locastro et al. | 416/197 A |
| 4,382,191 A * | 5/1983 | Potter | 290/55 |
| 4,383,801 A * | 5/1983 | Pryor | 416/17 |
| 4,606,697 A | 8/1986 | Appel | |
| 4,720,239 A * | 1/1988 | Owczarek | 415/181 |
| D300,932 S | 5/1989 | Sikes | |
| 4,869,644 A * | 9/1989 | Takigawa | 416/235 |
| 4,974,633 A * | 12/1990 | Hickey | 137/561 R |
| 5,131,785 A | 7/1992 | Shimazaki | |
| 5,133,516 A | 7/1992 | Marentic et al. | 244/130 |
| 5,193,978 A * | 3/1993 | Gutierrez | 416/24 |
| 5,261,801 A | 11/1993 | Stone | |
| 5,380,149 A * | 1/1995 | Valsamidis | 415/2.1 |
| 5,391,926 A * | 2/1995 | Staley et al. | 290/55 |
| 5,405,246 A | 4/1995 | Goldberg | |
| 5,463,257 A | 10/1995 | Yea | |
| 5,494,407 A | 2/1996 | Benesh | |
| 5,503,525 A * | 4/1996 | Brown et al. | 416/24 |
| 5,570,859 A * | 11/1996 | Quandt | 244/213 |
| 5,656,865 A * | 8/1997 | Evans | 290/55 |
| 5,760,515 A | 6/1998 | Burns | |
| 5,816,113 A | 10/1998 | Foehl | |
| 5,941,131 A | 8/1999 | Foehl | |
| 6,172,429 B1 | 1/2001 | Russell | |
| 6,283,711 B1 | 9/2001 | Borg et al. | |
| 6,287,082 B1 | 9/2001 | Dittmar | |
| 6,345,957 B1 | 2/2002 | Szpur | |
| 6,428,275 B1 | 8/2002 | Jaakkola | |
| 6,465,899 B2 | 10/2002 | Roberts | |
| 6,808,366 B2 | 10/2004 | Sikes | |
| 6,870,280 B2 | 3/2005 | Pechler | |
| 6,935,841 B2 | 8/2005 | Rainbow | |
| 7,008,171 B1 | 3/2006 | Whitworth | |
| 7,040,859 B2 | 5/2006 | Kane | |
| 7,044,711 B2 | 5/2006 | Duncan et al. | |
| 7,093,513 B2 | 8/2006 | Bostbarge | |
| 7,132,760 B2 | 11/2006 | Becker | |
| 7,287,954 B2 | 10/2007 | Kinkaid et al. | |
| 7,314,346 B2 | 1/2008 | Vanderhye et al. | |
| 7,344,353 B2 | 3/2008 | Naskali et al. | |
| 7,362,004 B2 | 4/2008 | Becker | |
| 7,364,406 B2 | 4/2008 | Kinkaid | |
| D597,028 S | 7/2009 | Sauer | |
| D638,358 S | 5/2011 | Sauer, Jr. | |
| 7,948,110 B2 | 5/2011 | Morgan et al. | |
| 7,976,267 B2 | 7/2011 | Burrell, IV | |
| 8,011,886 B2 * | 9/2011 | Subramanian et al. | 416/23 |
| 8,061,993 B2 | 11/2011 | Sassow | |
| 8,084,881 B2 | 12/2011 | Morgan et al. | |
| 8,662,854 B1 * | 3/2014 | Salaverry | 416/228 |
| 2002/0197104 A1 | 12/2002 | Bauman et al. | |
| 2006/0153682 A1 * | 7/2006 | Vanderhye et al. | 416/197 A |
| 2006/0198724 A1 | 9/2006 | Bertony | |
| 2007/0029807 A1 | 2/2007 | Kass | |
| 2007/0077145 A1 * | 4/2007 | Kinkaid et al. | 416/197 A |
| 2007/0086895 A1 * | 4/2007 | Vanderhye et al. | 416/197 A |
| 2007/0110585 A1 * | 5/2007 | Bonnet | 416/235 |
| 2008/0240923 A1 * | 10/2008 | Bonnet | 416/223 R |
| 2008/0246284 A1 | 10/2008 | Pelman et al. | |
| 2008/0273974 A1 | 11/2008 | Becker | |
| 2009/0184521 A1 * | 7/2009 | Chong | 290/55 |
| 2009/0189395 A1 | 7/2009 | Ryynanen et al. | |
| 2009/0243302 A1 * | 10/2009 | Eisenblaetter | 290/55 |
| 2009/0246027 A1 * | 10/2009 | Johnson | 416/197 A |
| 2009/0295293 A1 | 12/2009 | Lawton et al. | |
| 2010/0270808 A1 | 10/2010 | Bates et al. | |
| 2010/0284809 A1 | 11/2010 | Houlsby et al. | |
| 2010/0320771 A1 | 12/2010 | Urch | |
| 2010/0322770 A1 | 12/2010 | Sheinman | |
| 2011/0027084 A1 | 2/2011 | Rekret | |
| 2011/0081243 A1 | 4/2011 | Sullivan | |
| 2011/0107684 A1 | 5/2011 | Flores | |
| 2012/0057984 A1 * | 3/2012 | Fuglsang et al. | 416/234 |

FOREIGN PATENT DOCUMENTS

| | | |
|---|---|---|
| GB | 2386161 B | 9/2002 |
| JP | 6090992 A | 4/1994 |
| JP | 2006-348810 | 12/2006 |
| WO | 8101443 A1 | 5/1981 |
| WO | 99/04164 A1 | 1/1990 |
| WO | 02/46619 A2 | 6/2002 |
| WO | 2004/011798 A2 | 2/2004 |
| WO | 2006/063380 A1 | 6/2006 |
| WO | 2006/119648 A1 | 11/2006 |
| WO | 2007/048001 A2 | 4/2007 |

* cited by examiner

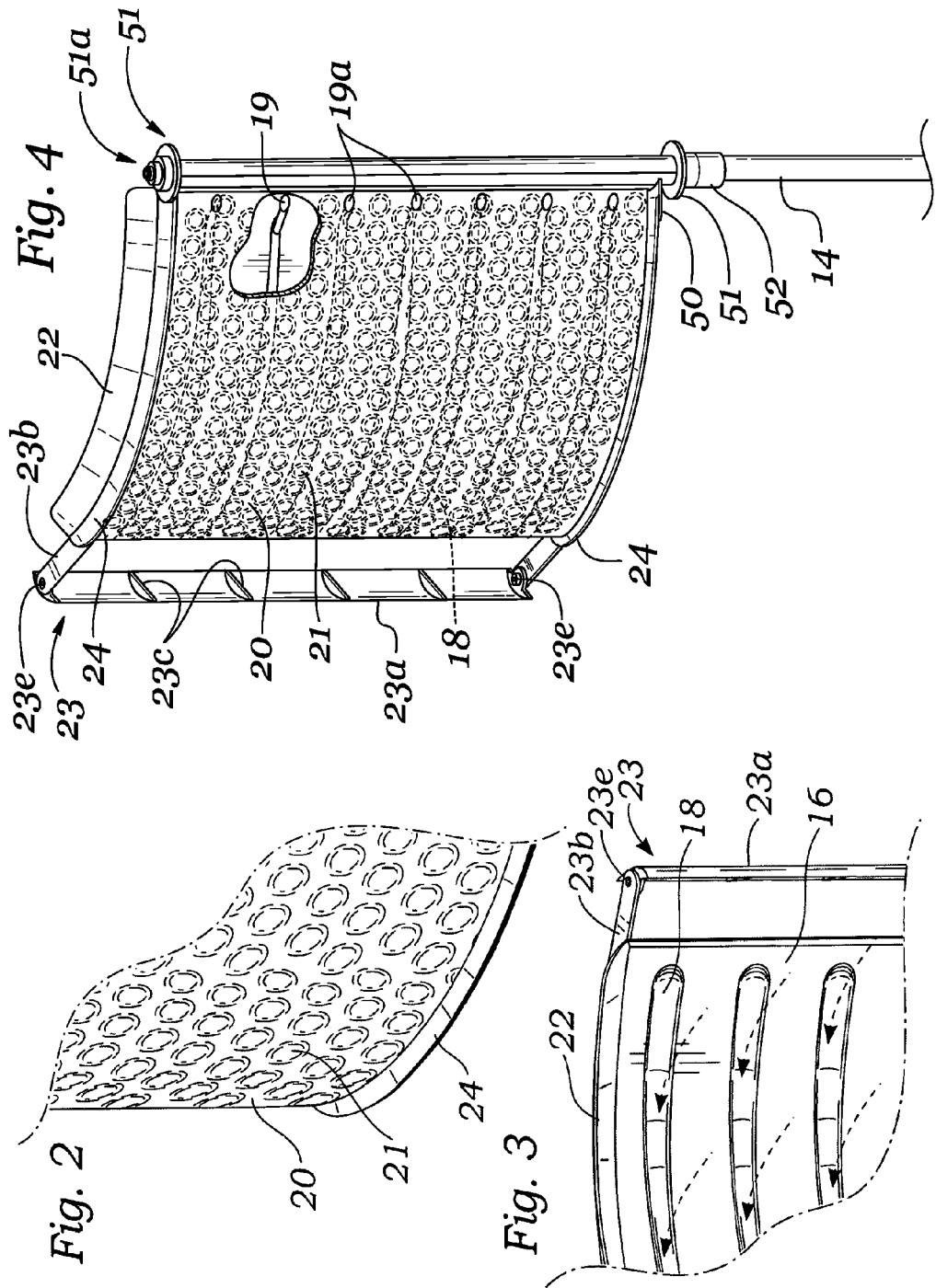

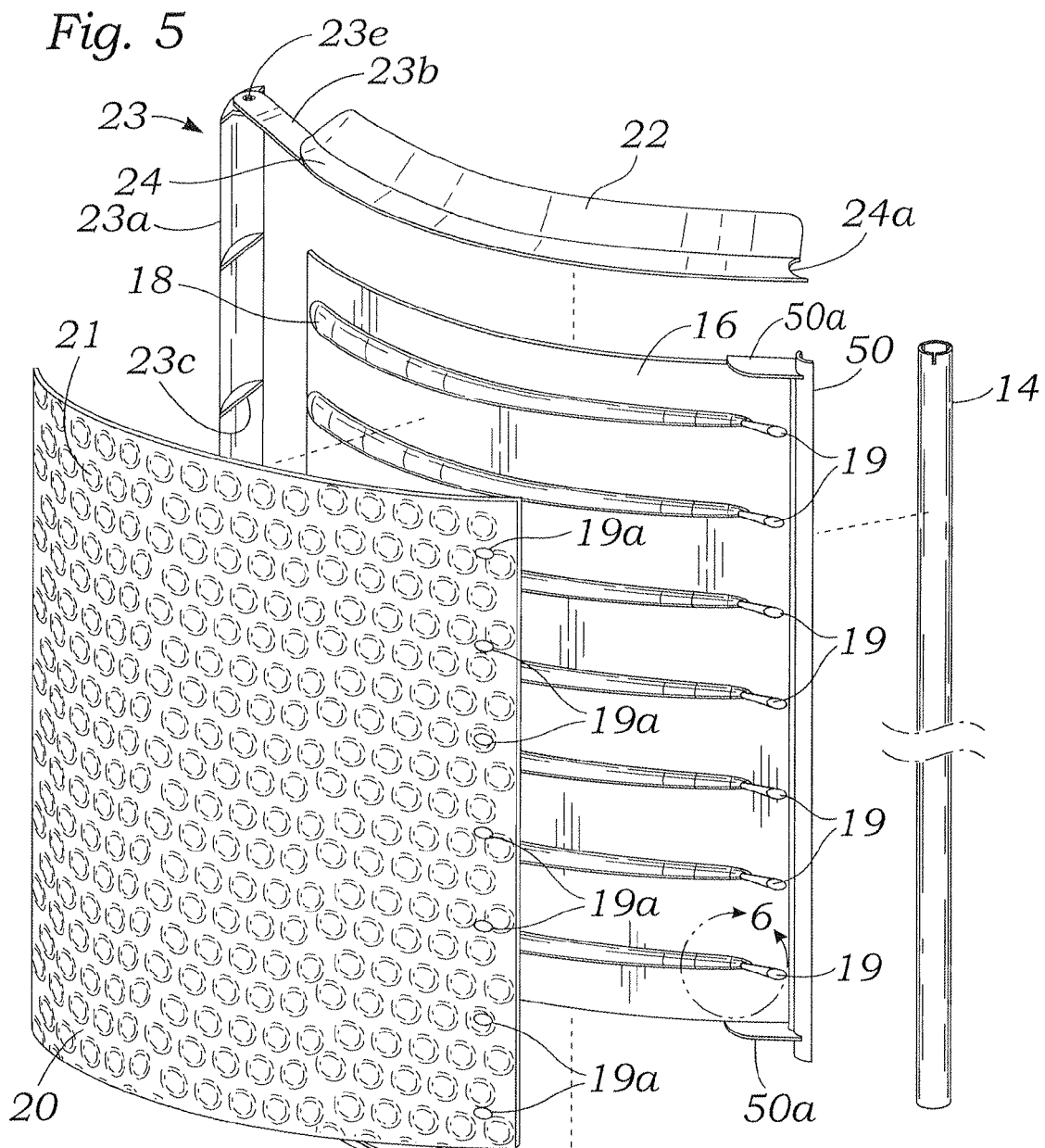
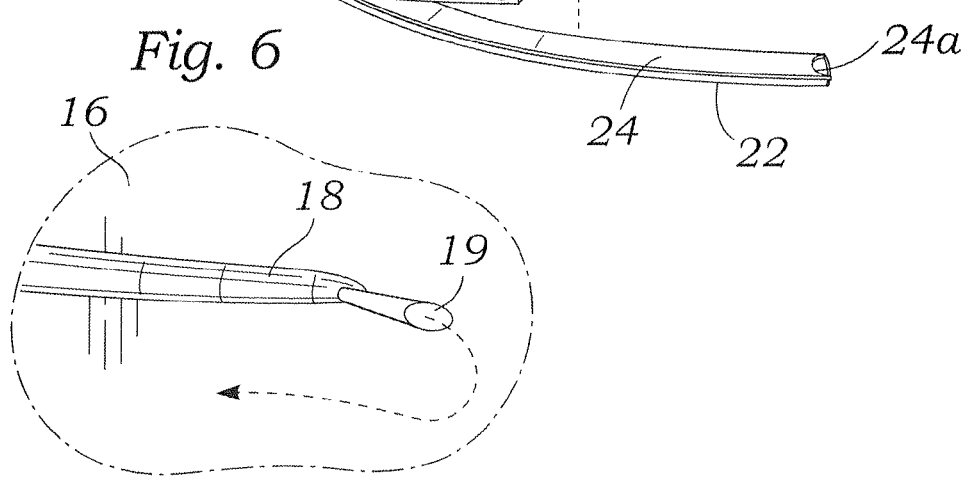

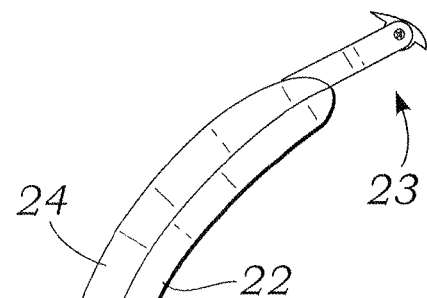
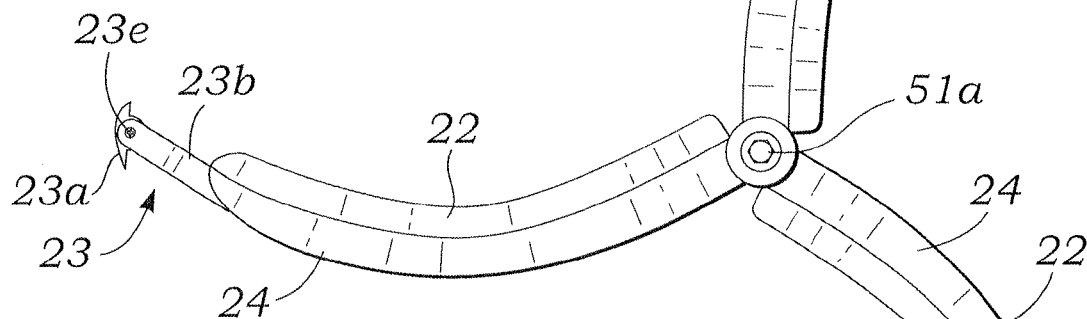
Fig. 7
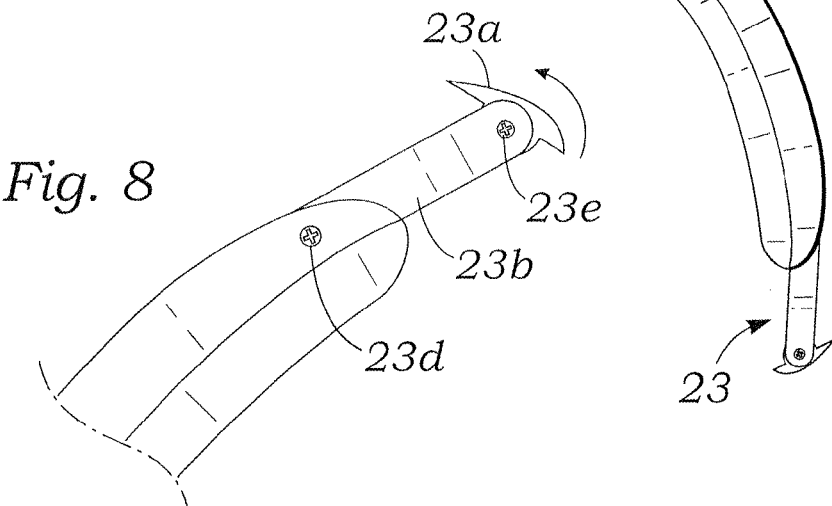
Fig. 8
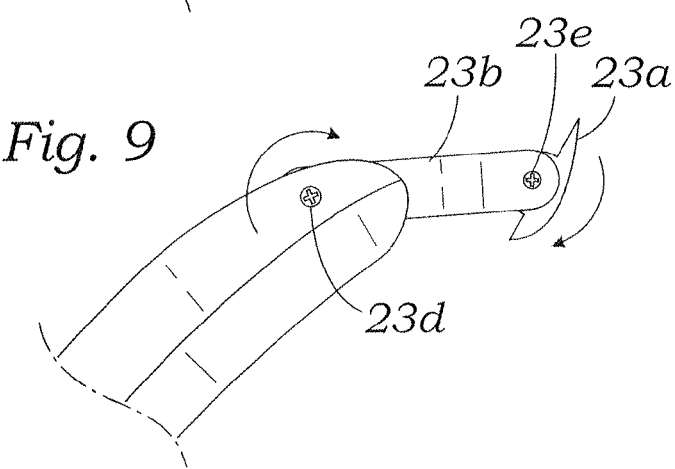
Fig. 9

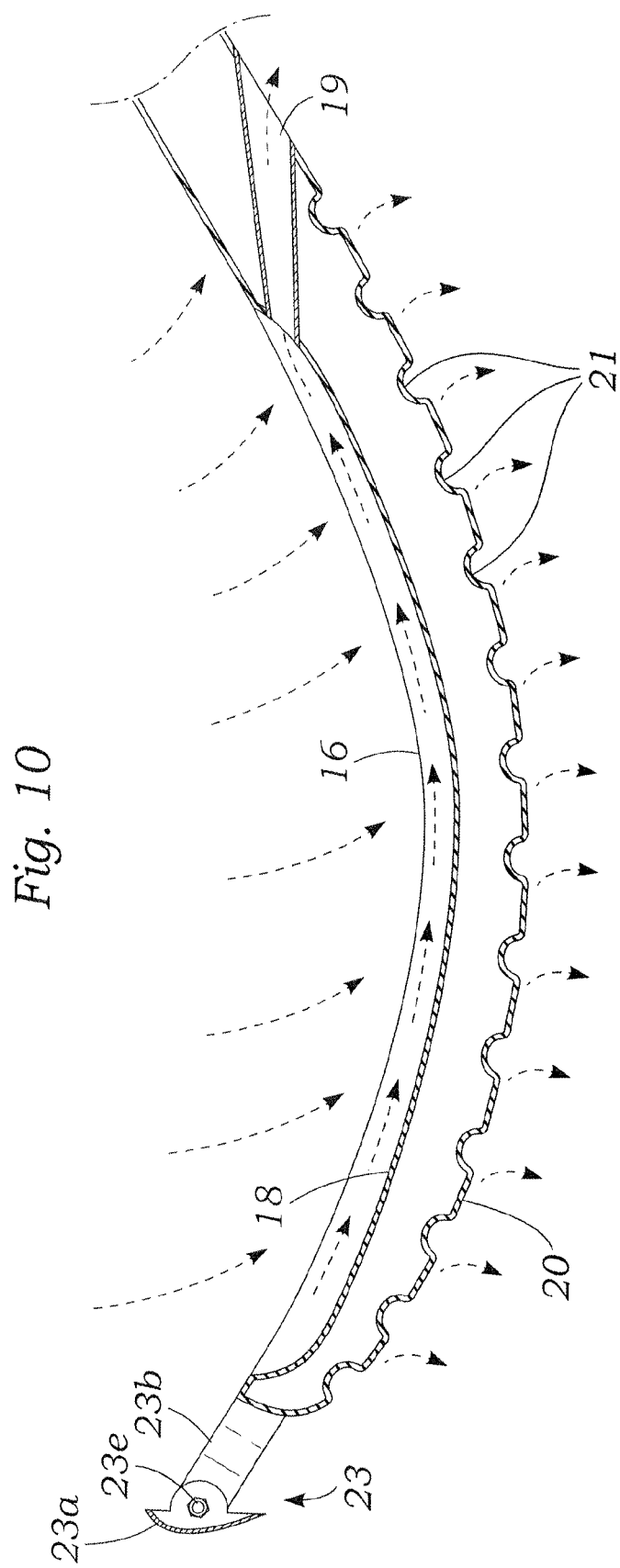

WIND SAIL TURBINE

CLAIM FOR BENEFIT OF EARLIER FILING DATE

This application is a continuation of prior application Ser. No. 13/134,049, filed May 27, 2011, now U.S. Pat. No. 8,864, 440, issued on Oct. 21, 2014. This application also claims the benefit of U.S. Provisional Application No. 61/456,876 filed on 15 Nov. 2010 and entitled "Wind Sail Turbine."

The background of the invention will be discussed in two parts.

BACKGROUND

1. Field of the Invention

The present invention relates in general to turbines for converting wind into electrical energy and more particularly to a self-starting omni-wind multifaceted wind sail.

2. Prior Art

Wind powered electrical turbines are well known in the prior art, however, a search of the art has not disclosed the wind turbine having the characteristics and capabilities of the present invention. Devices of interest are disclosed in: U.S. Pat. No. 5,133,637 issued to Wadsworth on Jul. 28, 1992 which relates to a vertical axis wind turbine having vanes for reducing friction on rotor shaft bearing assemblies; U.S. Pat. No. 6,308,521 issued to Eylman on Oct. 30, 2001 relating to a universal power generator utilizing the flow of wind to generate energy; and U.S. Pat. No. 7,798,766 issued to Dieter R. Sauer, Sir. on Jul. 21, 2010, relating to a vertical axis wind sail turbine with two identical wind sail vanes mounted 180 degrees apart each having a generally concave surface with an opposite surface that is generally convex.

In view of the prior art, it is an objective of the present invention to provide an improved omni-wind self-starting wind sail for wind driven electrical turbines. It is another objective to provide a wind sail that is efficient, economical and configured for multifaceted use in a variety of environments; the wind sail including three identical vanes centrally mounted 120 degrees apart onto a turbine drive shaft. Other objectives of the invention will become apparent with a reading of the specification taken with the drawings wherein there is shown and described the wind sail assembly of the invention.

SUMMARY

The invention discloses a wind turbine comprising a drive shaft; at least one vane connected to the drive shaft, the vane being adapted to capture air and be rotated by air, the vane's rotation being adapted to move the drive shaft and generate energy; and a torque converter attached to the vane, the torque converter comprising an airfoil, the torque converter being adapted to capture air for use in aiding the vane to rotate. The invention also includes a wind turbine comprising: a drive shaft; and at least one vane connected to the drive shaft, the vane configured to capture impinging wind and rotate, the vane being further configured to experience drag on rotation, the vane comprising a first surface and a second surface positioned opposite to the first surface, the first surface comprising a plurality of wind disrupters adapted to minimize drag on rotation of the vane. The invention further includes a wind turbine comprising a drive shaft; and a plurality of vanes rotatably connected to the drive shaft, the plurality of vanes comprising a plurality of strakes adapted to capture air and direct air to the drive shaft. Finally, the invention also includes a wind turbine comprising: a drive shaft; at least one vane connected to the drive shaft, the vane adapted to capture impinging wind and rotate around the drive shaft; and a first air scoop connected to the vane, the first air scoop comprising a first air scoop portion positioned at an angle relative to the vane, the first air scoop adapted to capture air flow and direct it into the vane.

DRAWINGS

FIG. 2 is a cut-away view showing the rear surface air disruptors of the vanes;

FIG. 3 is an enlarged view showing the front surface strakes of the vanes;

FIG. 4 illustrates the rear surface of each vane of the wind sail of FIG. 1;

FIG. 5 is an exploded view of the wind sail as shown in FIG. 4;

FIG. 6 is an enlarged view of the front surface strakes and associated air exit ports of a vane as indicated in FIG. 5;

FIG. 7 is a top view illustrating the scimitar-like curvature of the vanes;

FIG. 8 illustrates extension of the torque converters from the vanes;

Figure 1:
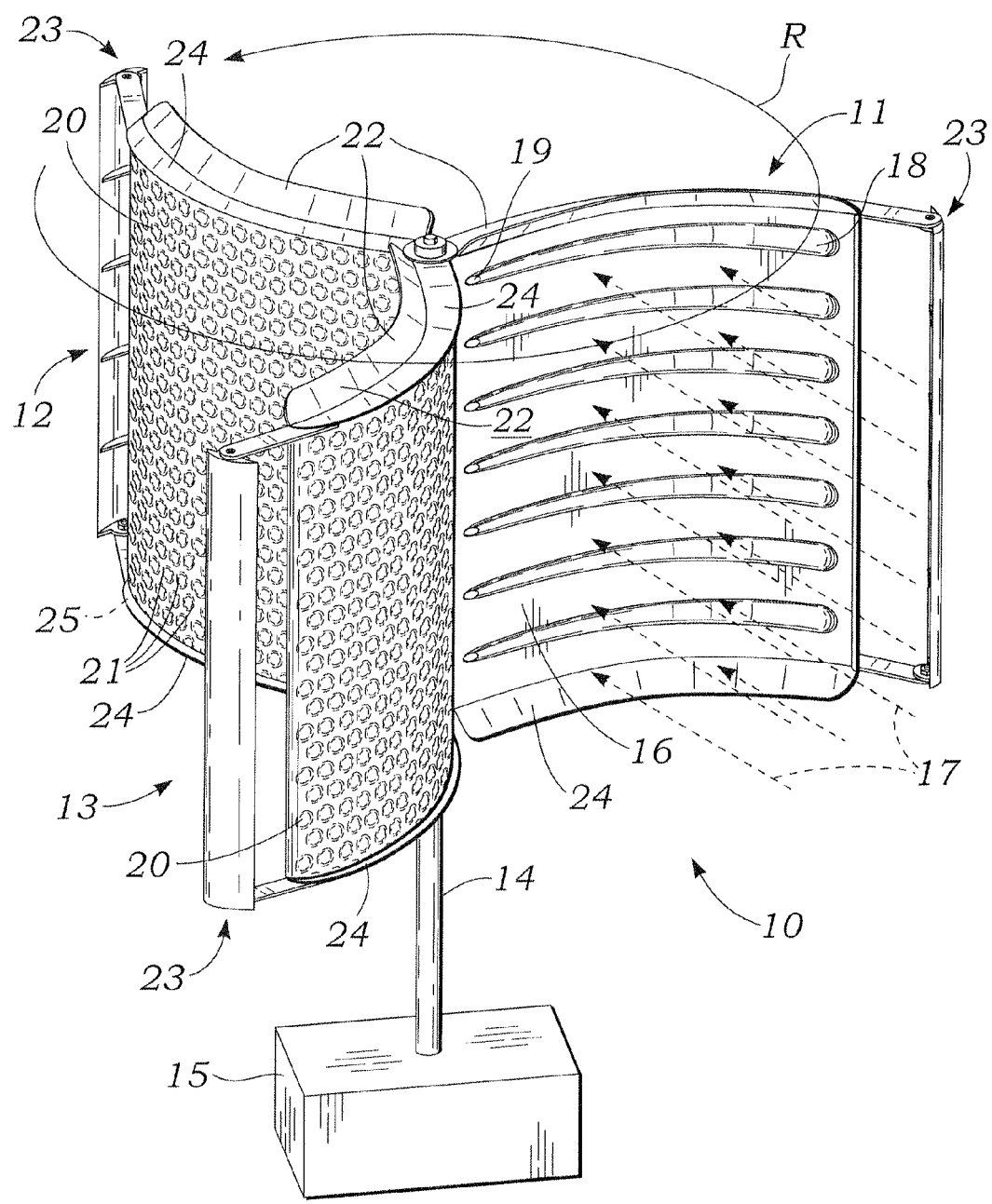
FIG. 1 illustrates the three vane wind sail in accordance with the invention.

FIG. 9 indicates the manner in which the torque converter can be pivoted; and

FIG. 10 indicates in cross-sectional view impinging air, and the direction of captured air within the strakes to, and through, the exit ports 19 to thereby exit the vanes and be propelled onto the following vane.

DESCRIPTION

The three vane wind sail assembly of the invention is designed to effect maximum capture and utilization of impending air. As disclosed, the vertical axis assembly includes three substantially identical vanes, or blades, centrally mounted 120 degrees apart onto a turbine drive shaft, subsequent drive shaft rotation being transmitted to power an electrical turbine. Each vane extends outwardly from the drive shaft with a curved scimitar-like curvature with the hack surface of the scimitar-like curvature having a concave configuration to capture impinging wind thrust, with the front surface of the scimitar-like shape having a convex configuration designed to provide minimal wind resistance. The resulting disparate wind resistance causes a stronger reaction on the concave side of a vane which in turn provides rotation of the drive shaft. Thus, as designed and mounted to the centrally located turbine drive shaft, the vane surfaces cooperate to maximize capture of impinging wind and to force rotation of the drive shaft The configuration of the wind sail assembly provides for self-starting in that regardless of the wind direction an adequate portion of a concave surface is continually presented to impinging wind, thus providing self-starting and continuous rotation of the drive shaft. Additionally, the wind sail assembly has omni-wind characteristics as the configuration of the combination of the concave and convex surfaces constantly provides adequate exposure to impinging wind to initiate rotation of the drive shaft regardless of the wind direction. The self-starting and omni-wind characteristics are augmented by inclusion of vane-through jet-like air exit ports configured for increasing the rotary force applied to the wind sail. Even though a three vane wind sail configuration is disclosed herein, it is to be understood that the number of vanes may be varied, more wind sails may be mounted to the same shaft, and as well, other modifications and embodiments may be made within the spirit and scope of the invention. For simplicity the invention is herein disclosed by description of individual parts. Further, it is to be understood that the vane parts as well as the vane itself may be molded, or otherwise combined, in a variety of ways. Materials used for construction of the vanes are selected to result in a lightweight and durable wind sail.

Referring now to the drawings, FIG. 1 illustrates in perspective view the wind sail, generally designated 10, of the invention. Wind sail 10 is seen to include three substantially identical rotor vanes, generally designated 11, 12 and 13, which are centrally mounted 120 degrees apart to turbine drive shaft 14 of turbine generator 15. Each vane 11-13 includes substantially identical top and bottom encasement plates 24, and as best shown on vane 11, each vane has a front generally concave surface 16 and as best shown on vane 13 a rear generally convex surface 20. The front concave surface 16 is configured to capture impinging wind, designated by arrows 17, to force counterclockwise rotation of the wind sail 10 about the drive shaft 14, as indicated by arrow R. The rear convex surface 20 includes wind disrupters 21 (vane 12) configured to minimize drag on rotation of the wind sail 10 about the drive shaft 14.

Each front concave surface 16 of vanes 11-13 includes a plurality of rows of open grooves, Or strakes, generally designated 18, running in generally parallel horizontal lines from the outer edge to the inner edge of vanes 11-13, that is, toward the drive shaft 14. The open grooves 18 are designed to capture impinging airflow and channel it inwardly toward the center rotor shaft 14 where there is located on each strake a relatively small air exit port 19. The grooves 18 are ribbed on both sides to better hold the air flow, and gradually increase in depth and decrease in width, in funnel-like manner, as they approach drive shaft 14 to thereby increase the velocity of the air therein. The captured air is then exited from grooves 18 through an associated exit port 19 and propelled against the concave surface 16 of the following vane. Exit ports 19 displaces airflow from the center vortex proximate the drive shaft 14. Thus, grooves 18, in combination with air exit ports 19, cooperate to create a jet-like effect directed to a following vane for increasing the rotary force applied to the wind sail 10.

Each vane 11-13 includes an upper air scoop, or flap 22 projecting outwardly and upwardly at an angle form the top encasement plate 24 of the convex surface 20. Air scoops 22 are designed to meet impinging air at an appropriate angle, such as 45 degrees, and direct it toward the concave surfaces 16. Each vane includes a bottom air scoop, or flap, 25 projecting outwardly and downwardly at an appropriate angle, such as 45 degrees, from the bottom encasement plate 24. Air scoops 22 and 25 function to capture the outside boundary air flow and direct it into the junction area of the vanes 11-13. The back sides of the air scoops are designed to deflect air away from the wind sail 10. Each vane may also include a variable torque converter, generally designated 23, configured to direct air into the grooves 18 and thus produce more rotational torque to the wind sail 10.

FIG. 2 is an enlarged view partially illustrating the rear convex surface disruptors 21 of the vanes 11-13. Disruptors 21 consist of multitudinous indentations arranged in a pattern designed to break up the air flow across the convex surface 20 and thereby create a boundary layer of air that operates to decrease air friction and thus promote rotation of drive shaft 14.

FIG. 3 is an enlarged partial view of the concave surface 16 showing, by the arrows, the direction of air flow in grooves 18 across the convex surface 16 and toward the associated air exit ports 19 of grooves 18. The grooves 18 can be more clearly seen to decrease in width as they approach the air exit ports 19. It is understood that other configurations of the strakes may be used as may be suitable within the spirit and scope of the invention. FIG. 3 also illustrates in partial view the torque converter 23, which as will be described, extends from top and lower plates 24 and provides variable multipurpose operation of wind sail 10.

FIG. 4 shows in greater detail the rear convex panel 20 of the vanes 11-13. Shown are air disrupters 21, scoop 22, top and bottom plates 24, torque converter 23, and in a cut-away view indicates an air exit port 19. Other exit ports 19 are shown with the grooves 18 indicated in dotted lines. Torque converter 23 includes vertically extending blade, or airfoil, 23a (see also FIGS. 7-9) pivotally mounted to top and bottom plates 24 by extensions 23b and designed to evenly spread rotational torque of the wind sail 10 about the drive shaft 14. Airfoils 23a have a curved outside face and include ribs 23c to grasp impinging wind and increase torque generated by the wind sail 10. Airfoils 23a are pivotally mounted to extensions 23b at pivot points 23e.

Also shown in FIG. 4 is a simplified example of the manner in which vanes 11-13 may be attached to and supported by drive shaft 14. Each of vanes 11-13 includes a longitudinal side member 50 (see also FIG. 5) configured for fitting along drive shaft 14. Top and bottom plates 24 are as well configured at 24a for fitting onto drive shaft 14. An attachment assembly, generally designated 51, captures and supports the lower end of side member 50 with attachment assembly 51a supporting the upper end of side member 50. It is understood that this arrangement is by way of example only and that other suitable means for attachment and support of the vanes 11-13 to drive shaft 14 are within the scope of the invention.

FIG. 5 is an exploded view showing the vane of FIG. 4 with the rear convex surface 20 extended from concave surface 16 to illustrate the inward side of front concave surface 16. The grooves 18 and their respective exit ports 19a are more clearly indicated. Although the bottoms of grooves 18 are shown by way of explanation visibly pushed inwardly, it is understood that depending on the method of fabrication of surface 16 the bottoms of grooves 18 could be covered and not visible. Convex surface 20 illustrates air output holes 19a for exit ports 19 that extend through convex surface 20. FIG. 5 further illustrates the previously discussed simplified manner in which vanes 11-13 may be attached to and supported by drive shaft 14. Shown is the longitudinal side member 50, with support the tabs 50a configured for fitting along the drive shaft 14, the top and bottom plates 24 configured at 24a for fitting onto drive shaft 14.

FIG. 6 is an enlarged view showing, as indicated in FIG. 5, a groove 18 with air being expelled, as indicated by the arrow, from the associated air exit port 19. As indicated the exit aperture dimensions of exit ports 19 may be different from, such as larger than, the dimensions of the entrance aperture from the groove 18.

FIG. 7 is a top view indicating the curved scimitar-like configuration of wind sail vanes 11-13 and the manner of attachment of torque converters 23 to plates 24. As seen, torque converters 23 include an extension arm 23b having an airfoil 23a pivotally mounted thereto at pivot point 23e. Although torque converter 23 is shown to extend the scimitar-like configuration of the vanes 11-13, as further shown in FIGS. 8 and 9 the torque converter 23 is constructed to be variably pivotal.

FIG. 8 further shows the manner in which torque converter 23 is pivotally mounted to plates 24. Extension arm 23b is mounted at one end to plate 24 at pivot point 23d, and at the other end to airfoil 23a at pivot point 23e.

FIG. 9 indicates the manner in which the torque converter 23 may be variably pivoted. As shown and described extension arm 23b is pivotal at pivot point 23d and airfoil 23a is pivotal at pivot point 23e. Airfoils 23 may thus be oriented to impinging wind as may be desired for different operating environments and conditions.

FIG. 10 indicates in cross-sectional view, by the arrows, impinging air and direction of air captured by the grooves 18 to, and through, exit ports 19 to thereby exit the vanes 11-13 and be propelled onto the concave surface of the following vane.

While the principles of the invention have been shown and described in a single embodiment, it will be obvious to those skilled in the art that in practice of the invention many modifications may be made in adaptation for specific environments and operating requirements without departing from these principles.

What is claimed is:

1. A wind turbine comprising:
   (a) drive shaft having a rotational axis;
   (b) at least one vane connected to the drive shaft, the vane being adapted to capture air and be rotated by air, the vane's rotation being adapted to move the drive shaft and generate energy; and
   (c) a torque converter spaced from an outer edge of the vane and comprising an airfoil positioned parallel to the rotational axis of the drive shaft and an extension arm having a first end pivotably attached to the vane creating a first pivot point allowing the extension arm to pivot relative to the vane and a second end pivotably attached to the airfoil creating a second pivot point allowing the airfoil to pivot relative to the extension arm, the torque converter being adapted to capture air and aide the vane to rotate.

2. The wind turbine of claim 1, wherein the torque converter is pivotably attached to the vane and is adapted to pivot when it captures air.

3. The wind turbine of claim 1, wherein the torque converter is in a vertical position and substantially parallel to the drive shaft.

4. The wind turbine of claim 1, wherein the torque converter comprises a curved face adapted to capture impinging wind.

5. The wind turbine of claim 1, wherein the torque converter further comprises an airfoil and a plurality of ribs attached to one side of the airfoil, the plurality of ribs adapted to grasp impinging wind.

6. The wind turbine of claim 1, wherein the vane further comprises a first surface and a second surface positioned opposite to the first surface, the first surface comprising a plurality of strakes, the plurality of strakes adapted to capture air and direct air to the drive shaft.

7. The wind turbine of claim 6, further comprising a plurality of vanes attached one after another along the drive shaft, wherein at least one of the plurality of strakes is connected to a jet port, the jet port being adapted to direct air to a vane that follows.

8. A wind turbine comprising:
   (a) a drive shaft; and
   (b) at least one vane connected to the drive shaft, the vane configured to capture impinging wind and rotate, the vane being further configured to experience drag on rotation, the vane comprising a convex surface and a concave surface positioned opposite to the convex surface, the convex surface defining a plurality of wind disrupters adapted to minimize drag on rotation of the vane and a plurality of air output holes, the concave surface defining a plurality of strakes that includes corresponding exit ports, the corresponding exit ports being continuous with and cooperate with their corresponding air output holes to direct air flow to a subsequent vane.

9. The wind turbine of claim 8, wherein at least one of the plurality of wind disrupters comprises multitudinous identation arranged in a pattern.

10. The wind turbine of claim 8, further comprising a first air scoop connected to the vane, the first air scoop comprising an air scoop portion positioned at an angle relative to the vane, the first air scoop adapted to capture air flow and direct it into the vane.

11. The wind turbine of claim 10, further comprising a second air scoop attached to the vane at a position opposite to where the first air scoop is attached.

12. A wind turbine comprising:
   (a) a drive shaft;
   (b) at least one vane connected to the drive shaft, the vane adapted to capture impinging wind and rotate around the drive shaft, the vane including a concave surface defining a plurality of strakes for capturing wind and corresponding exit ports and a convex surface opposite the first concave surface, the convex surface defining a plurality of air output holes that cones and to and are continuous with their respective exit ports to cooperatively direct air flow to a subsequent vane;
   (c) a first air scoop connected to the vane, the first air scoop comprising a first air scoop portion positioned at an angle relative to the vane, the first air scoop adapted to capture air flow and direct it into the vane.

13. The wind turbine of claim 12, further comprising a second air scoop attached to the vane at a position opposite to where the first air scoop is attached.

14. The wind turbine of claim 12, further comprising a torque converter attached to the vane, the torque converter being adapted to capture air for use in aiding the vane to rotate.

15. The wind turbine of claim 14, wherein the torque converter is pivotably attached to the vane.

* * * * *